(12) United States Patent
Mattox

(10) Patent No.: US 6,437,729 B1
(45) Date of Patent: Aug. 20, 2002

(54) INTEGRATOR FOR RADAR RETURN SIGNALS WITH HIGH ACCELERATION UNCERTAINTY

(75) Inventor: Barry G. Mattox, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/559,665

(22) Filed: Apr. 28, 2000

(51) Int. Cl.[7] .............................................. G01S 13/536
(52) U.S. Cl. ...................... 342/106; 342/109; 342/115; 342/192; 342/195; 342/196
(58) Field of Search ...................... 342/27, 28, 104–117, 342/175, 192–197, 89–103, 134, 135, 159–164

(56) References Cited

U.S. PATENT DOCUMENTS 3,885,240 A * 5/1975 Jensen ......................... 342/106
6,313,785 B1 * 11/2001 Mattox ........................ 342/106

* cited by examiner

*Primary Examiner*—Bernarr E. Gregory
(74) *Attorney, Agent, or Firm*—Burns, Doane, Swecker & Mathis, LLP (57) ABSTRACT

A radar signal processing method and system for detecting target objects of unknown acceleration and having low SNRs which reduces the computational burdens and provides a more efficient way of performing the operation of non-coherent integration. Radar signal processing is conducted according to a predetermined scheme in which partially processed received signal data is selectively stored and reused, reducing redundant processing. The radar system receives return signals frequency shifted from a predetermined frequency scheme by unknown amounts. The received signals are coherently integrated transforming them into frequency domain templates which are non-coherently arranged into an array matrix. The data of the frequency domain templates are processed to form presums which are stored for use in forming higher level presums and for forming acceleration bins. Once the acceleration bins have been formed, they are analyzed to detect the presence of target object return signals.

19 Claims, 7 Drawing Sheets

INTEGRATOR FOR RADAR RETURN SIGNALS WITH HIGH ACCELERATION UNCERTAINTY

The present application is related to Application Ser. No. 09/559,664 entitled "Dual Detection Processing for Signals with High Uncertainty in Acceleration" which is filed on even date herewith, the disclosure of which is herein incorporated by reference in its entirety, now U.S. Pat. No. 6,313,785.

BACKGROUND OF THE INVENTION

1. Field of the Invention

This invention involves an improved method and apparatus for radar signal processing. In particular, the present invention pertains to a binary branching technique of non-coherent integration radar signal processing with reduced computational complexity.

2. State of the Art

Radar systems detect distant target objects by transmitting signals and detecting the echos reflected back from the target object. Detection of a target object can include, for instance, determining target object data such as position, direction of movement, velocity and acceleration. Conventional radar systems transmit electromagnetic signals with, for example, predetermined frequencies in the megahertz range up to light wave frequencies in the visible spectrum. The transmitted radar signal of predetermined frequencies may include pulses or waveforms transmitted at varying frequencies. Such varying frequencies may be used, for instance, to implement linear frequency modulated chirp pulses, signal encoding schemes, or the like. The radar system transmitter and receiver can either be co-located or located at different positions.

Signal strength of the return signal varies inversely to the fourth power with the distance R between the radar system and the target ($1/R^4$). As a result, the signal strength of return signals reflected from the target tend to be relatively weak in comparison to the transmitted signal.

Signal strength is important in discerning information about a target object. Signal strength and signal quality are affected by a number of radar parameters and target variables, in addition to being affected by the distance between the radar system and the target. For instance, the parameters of radar aperture, transmit power and amplifier efficiencies each affect the ability of a radar system to detect return signals. Target characteristics pertaining to target size and shape, the target object material, target velocity and acceleration, each affect the quality and strength of the return signal. Small, fast moving, distant targets-such as missiles, for instance—can be especially challenging to detect. The return signals of such target objects become very difficult to detect as they approach the level of noise due to background interference or electromagnetic clutter.

Return signals can be subjected to signal processing to discern their Doppler characteristics and determine the position, velocity and acceleration of the target object. As the signal-to-noise ratio (SNR) decreases, signal processing tends to become more important for signal detection. But signal processing also becomes more difficult as signal strength decreases because the SNR becomes smaller and the return signal gets lost in the background noise.

Signal processing may be used to detect low SNR signals, especially if the low SNR signal has few unknown variables. In general, low SNR signals with fewer unknown variables are easier to detect than low SNR signals with more unknown variables. For example, signals having a known acceleration value are easier to detect than signals with an unknown acceleration component.

One way of reducing the unknown characteristics of a return signal pertains to signal phase. To aid in signal processing, radar signals are often coherently transmitted. Signal coherence simply refers to a continuity of phase from one transmitted signal to the next, as if the signals had been chopped out of the same continuous waveform. Use of coherent signals enables the detection of Doppler shifting due to changes in relative velocity between the radar system and the target object.

Signal processing generally involves transforming received signals from the time domain to a frequency domain representation through a process of coherent integration such as a fast Fourier transform (FFT) filter. Once the received signals have been transformed into the frequency domain, signal processing can be used to analyze the Doppler shift of coherent signals to determine information about the target object, so long as the return signals have sufficient signal strength.

Figure 1A:
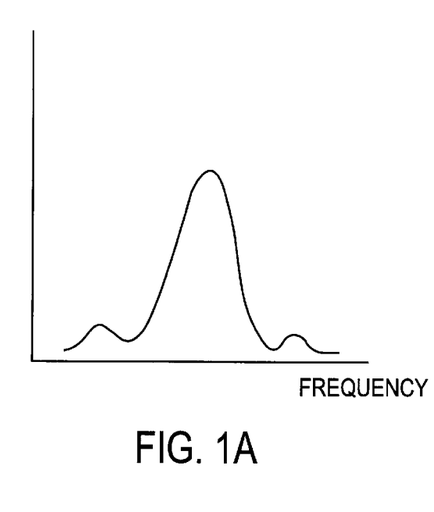
FIG. 1A is an FFT frequency domain representation of a received signal.

FIG. 1A is an FFT frequency domain representation of a received signal. The FFT shown in FIG. 1A indicates the relative velocity between the radar system and the target object. Target objects with higher velocities relative to the radar system have higher frequencies, and are shown shifted to the right. Target objects moving more slowly relative to the radar system have lower frequencies, and are shown shifted to the left.

By analyzing the FFTs corresponding to different time segments, changes in target velocity can be determined. This allows for an approximate determination of acceleration. However, to make such an approximate acceleration determination using a conventional radar signal processor, the received signal must be strong enough for detection in each FFT. If the SNR is too low for target detection in the FFTs of different time segments, no velocity comparison can be made, as required for determining acceleration.

In conventional radar systems, signal processing can be used to detect return signals and determine an unknown target acceleration for return signals characterized by high SNR. Conventional radar systems may also be able to detect the presence of return signals characterized by low SNR, but only if the acceleration component of the return signal is known.

SUMMARY OF THE INVENTION

The Applicants recognize that if acceleration is unknown for low SNR signals, the computational complexity of signal processing becomes much more extensive, to the extent of being beyond the computational capabilities of today's technology. Therefore, Applicants identify one drawback of conventional radar systems as being the inability to detect low SNR return signals having unknown acceleration components. In other words, conventional radar systems lack a means of reducing the computational burdens which would be associated with signal processing return signals characterized by low SNR and having unknown acceleration characteristics.

The present invention is directed to reducing the computational burdens associated with processing return signals of unknown acceleration and having low SNRs. The present invention provides a more efficient way of performing signal processing including the operation of non-coherent integration.

Generally speaking, exemplary embodiments are directed to radar signal processing according to a predetermined scheme in which partially processed received signal data is selectively stored and reused. By doing so, redundant processing is reduced, thus enabling the radar signal processor to detect signals with an unknown acceleration component using a reasonable number of signal processing computations.

The present invention is directed to a radar signal processing method and system for detecting target objects. According to one embodiment, radar signals are transmitted from a radar system in a predetermined frequency scheme. The radar system receives signals within a frequency band which includes frequencies of the predetermined frequency scheme and frequencies of return signals echoed from the target object. The frequencies of the return signals may be frequency (Doppler) shifted from the predetermined frequency scheme by unknown amounts, making detection by conventional methods computationally burdensome or even impossible due to the combination of uncertainty in both Doppler velocity and acceleration. The received signals are then coherently integrated to transform them from time domain data into frequency domain templates of data. Once the received signals are in the form of frequency domain templates, they are arranged into an array matrix. The data of the frequency domain templates are processed to form presums, which are stored for use in forming higher level presums and for forming acceleration bins. Once the acceleration bins have been formed, they are analyzed to detect the presence of target object return signals.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1B:
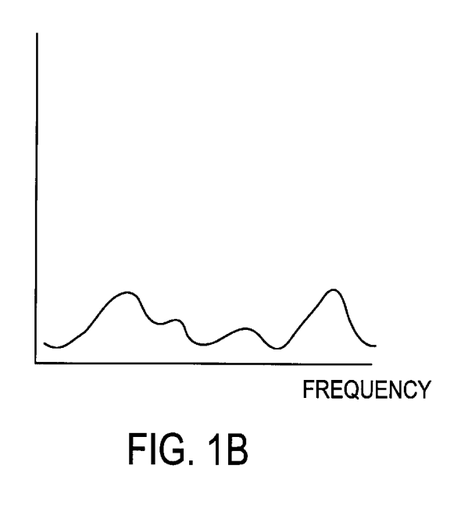
FIG. 1B is an FFT frequency domain representation of a noisy received signal.

FIG. 1B is a frequency domain representation of a noisy received signal. Signal processing through a process of coherent integration or frequency domain transformation may be used to transform received signals from the time domain into a frequency domain representation. The coherent integration is commonly achieved through use of a Fourier transform filter or a fast Fourier transform (FFT) filter. To simplify the explanation of the present invention, the concept of coherent integration or frequency domain transformation is referred to as FFT processing, or simply as FFT. Other equivalent methods of frequency domain transformation or coherent integration may also be used with the present invention, such as optical Fourier transforms, filter banks, or like methods or devices.

Once the received signals have been transformed into the frequency domain, signal processing can be used to analyze the Doppler shift of coherent signals to determine information about the target object, so long as the return signals have sufficient signal strength. The noisy received return signal FFT of FIG. 1B, characterized by a low ratio of the signal strength to the interference level, illustrates problems which can arise when trying to detect a reflected signal having a low SNR, that is, a signal which is not much stronger than the background noise. As can be seen in the figure, it is unclear whether the first peak, the second peak, or both, are return signals. In a relatively noisy environment with high levels of interference, it may be that both the peaks of FIG. 1B are merely noise spikes or some other form of interference rather than return signals. Efforts to detect low SNR return signals often result in unacceptably high false detection rates.

Optimally, a signal to be detected will have a much stronger signal strength than the surrounding noise and interference. However, even a high SNR return signal with strong strength can result in detection problems. For instance, strong signals may be accompanied by spurious harmonic signals. Such harmonics may themselves be falsely detected as signals.

Figure 1C:
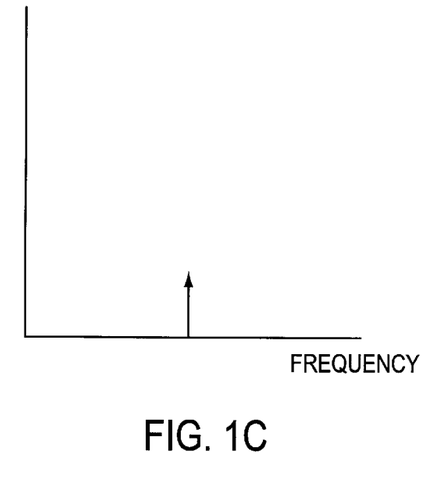
FIGS. 1C and 1D are simplified conceptual representations of the FFTs of FIGS. 1A and 1B.
Figure 1D:
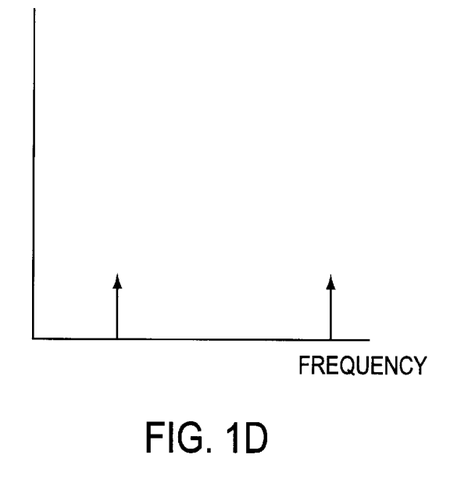

FIGS. 1C and 1D are simplified conceptual representations of the frequency domain representation, or FFTs, of FIGS. 1A and 1B. A single frequency domain representation corresponding to a particular time segment of the received signal, as shown in FIGS. 1C and 1D for example, may be referred to as an FFT template or simply as an FFT. An FFT template can be depicted as a row of numbers or units of data, with each number or unit of data representing the strength of a return signal and/or noise component at a given frequency. The individual units of data forming an FFT template are called FFT lines.

Figure 2A:
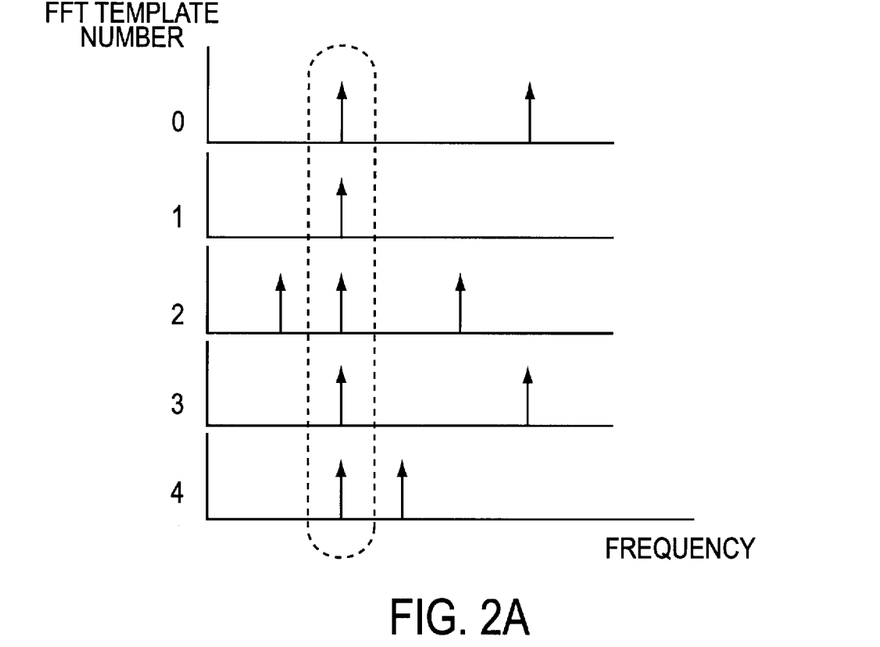
FIG. 2A is an FFT array matrix containing a constant velocity signal and random noise.

FIG. 2A is an FFT array matrix containing a constant velocity signal, along with random noise. The FFT array matrix, known simply as an array, is constructed by aligning and stacking various FFT templates transformed from different time segments of the received signal. The process of aligning and stacking the various FFT templates is a preliminary to noncoherently adding the FFT templates. The array is noncoherent in the sense that phase data pertaining to the return signals is discarded since phase decorrelates for times longer than the coherency time. According to a preferred embodiment, this may be accomplished by taking the magnitude squared of each FFT line.

Use of such an array for detection of low SNR signals of unknown acceleration does not result in excessive time delay so long as the delay due to noncoherent integration is considerably shorter than the observation time allowed for making a detection decision. Making use of the total allowable observation time to obtain the most reliable detection decision requires the noncoherent integration of intermediate results of coherently integrated segments of the return signal. For example, if the coherency time for a return signal from a missile is 100 microseconds and as much as 100 milliseconds of observation time is allowed, then 1,000 products of coherent integrations (i.e., 1,000 of the 100 microsecond segments) can be noncoherently integrated.

The fast Fourier transform of a particular time segment of the return signal is reflected as an FFT template (horizontal row) in the FFT array. A large number in the row indicates the presence of a signal (or a noise spike perceived to be signal). The horizontal axis in an FFT array corresponds to Doppler frequency which is an indication of target velocity. Signals towards the left end of a template have lower target velocities than signals towards the right end. Signals of different FFT templates which are in the same vertical column have the same frequency, and thus have the same target velocity. Therefore, FFT array columns represent velocity bins or velocity gates. The array comprises a number of adjacent velocity bins corresponding to the columns of the array.

Each row of the FIG. 2A array constitutes an FFT template for a different time segment of a received signal. By arranging multiple FFTs from various time segments into an FFT array, further signal processing can be used to detect signals at low signal strength levels relative to the level of interference. Statistics can be used in determining whether or not a signal is present. Statistical analysis for signal detection involves determining whether there is a trend of the same signal being present in a number of different FFT templates. For example, the return signal of a constant velocity target would be expected to appear in an FFT array velocity bin as a vertical column of FFT lines containing the signal, as shown in FIG. 2A. If the constant velocity return signals have low SNR, the signal component of the velocity gate for individual FFTs may not be apparent. However, the data from the multiple FFTs can be statistically analyzed to determine whether or not a target is present. The process of summing FFT lines from different FFT templates for statistical analysis and signal processing is referred to as noncoherently adding the FFT lines, since phase data of the signals has been discarded.

Figure 2B:
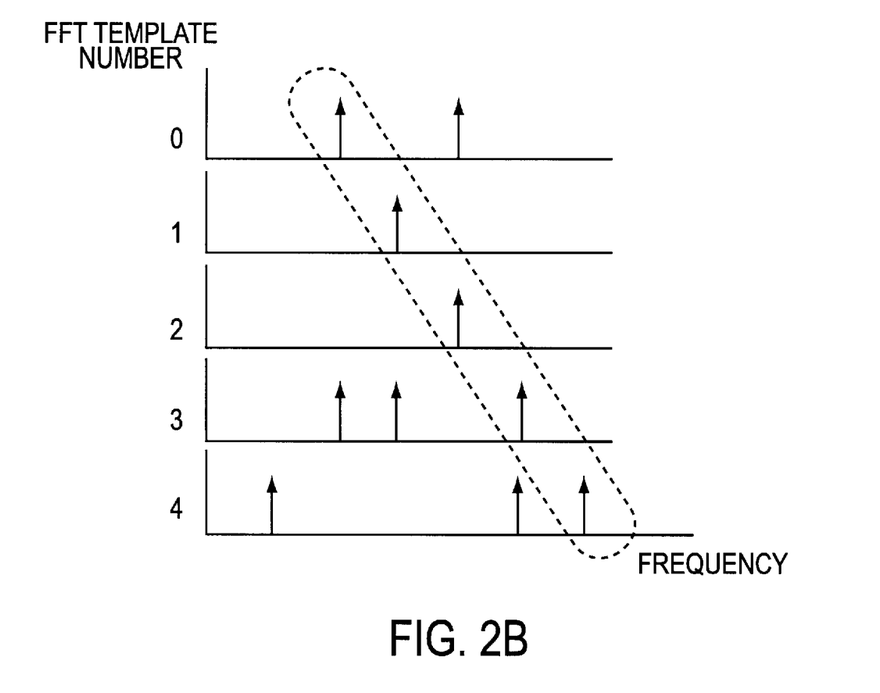
FIG. 2B is an FFT array matrix containing a signal with a constant acceleration component, and random noise.

FIG. 2B is an FFT array containing a signal with a constant acceleration component. A return signal with an acceleration component shows up in different velocity bins of the various FFT templates making up an array. That is, a signal with an acceleration component, by definition, is characterized by velocity which varies over time. Therefore, for subsequent FFT templates (rows), the signal appears to move across the velocity bins (columns). In other words, an accelerating signal "walks" across various velocity bins from one FFT template of the array down to the next. Higher acceleration components are characterized by greater walk rates.

A walk rate produces a signal with an acceleration slope. Signals with small acceleration components—that is, which are nearly constant in velocity—walk across relatively few velocity bins and appear nearly vertical. The greater the acceleration, the more velocity bins the signal walks across and the more the slope flattens out, tending towards horizontal. In the context of the present disclosure, the term "acceleration" is defined to be either a positive acceleration or a negative acceleration, in either absolute terms or terms of relative movement between the target and the radar system. Thus, a signal from a target which is either accelerating or decelerating is thought of as having an acceleration component. Note that a target which is decelerating has a negative acceleration slope. A decelerating target would appear as signals trending downward and to the left of an FFT array.

To detect a signal with an unknown acceleration component, the templates along each possible acceleration slope must be noncoherently added and processed. Typically, neither acceleration nor velocity is known beforehand for a target. Therefore, for a return signal with acceleration uncertainty, all the resolvable acceleration slopes must be evaluated for each velocity bin—not merely for the first velocity bin. That is, detection of a low SNR signal with an unknown acceleration component entails analyzing all acceleration slopes for each velocity bin of the array. For example, each acceleration slope would be evaluated for velocity bin 0, then each acceleration slope would be evaluated for velocity bin 1, and so on, up through all velocity bins of the array.

The detection of a signal with acceleration uncertainty using conventional "brute force" processing methods would require an enormous computational volume. The ability to perform such brute force computations is beyond the computational capabilities of present systems. Thus, low SNR signals with acceleration uncertainty require signal processing which is not feasible according to conventional methods or the capabilities of conventional signal processors.

The following relationships define the processing load required for noncoherent integration of low SNR return signals with acceleration uncertainty. Velocity resolution is the degree of accuracy in detecting a target's velocity, and corresponds to the width of each velocity bin. The velocity resolution $\delta v$ is inversely proportional to the coherent integration time T. The velocity resolution $\delta v$ can be described by the equation:

$$\delta v = \lambda/(2T) \tag{1}$$

In equation (1), $\delta v$ is the velocity resolution, $\lambda$ is the wavelength of the return signal, and T is the coherent integration time.

Velocity uncertainty $\Delta v$, which is the range of possible velocities that a signal processor is able to detect, corresponds to the width of the FFT array. Ideally, the velocity uncertainty $\Delta v$ represents the range of velocities that a return signal is likely to have. The number of velocity bins M is determined by dividing the velocity uncertainty $\Delta v$ by the velocity resolution $\delta v$:

$$M = \Delta v/\delta v \tag{2}$$

In equation (2), M is the number of velocity bins, $\Delta v$ is the velocity uncertainty, and $\delta v$ is the velocity resolution.

Acceleration resolution is the degree of accuracy in detecting a target's acceleration. To determine the acceleration resolution $\delta a$, the velocity resolution $\delta v$ is divided by the total dwell time, $T_{total}$:

$$\delta a = \delta v/T_{total} \tag{3}$$

In equation (3), $\delta a$ is the acceleration resolution, $\delta v$ is the velocity resolution, and $T_{total}$ is the total dwell time.

The range of acceleration values which a radar signal processor can detect is known as acceleration uncertainty $\Delta a$. In setting up a signal processor, an acceptable parameter for the acceleration uncertainty $\Delta a$ must initially be chosen. The number of acceleration bins $N_A$ is the acceleration uncertainty $\Delta a$ divided by the acceleration resolution $\delta a$:

$$N_A = \Delta a/\delta a \tag{4}$$

In equation (4), $N_A$ is the number of acceleration bins, $\Delta a$ is the acceleration uncertainty, and $\delta a$ is the acceleration resolution. If $\Delta a$ is restricted to a value such that velocity changes at most are one FFT bin during a coherent integration time, then $\Delta aT \leq \delta v$. This prevents significant noncoherent integration loss. With this constraint, the number of FFTs is $N \geq N_A$.

The number of computations $n_c$ required for brute force computation of the acceleration integrations for all of the velocity bins is the number of velocity bins M multiplied by the number of acceleration bins $N_A$ multiplied by the number of FFTs to add:

$$n_c = MN_A N_{FFT} \geq MN_A^2 \quad (5)$$

In equation (5), $n_c$ is the number of computations required, M is the number of velocity bins, $N_A$ is the number of acceleration bins, and $N_{FFT}$ is the number of FFTs to be added.

For a processor to perform the computations in real-time, the processor would have to compute at a rate of:

$$n_c/T_{total} \geq MN_A^2/T_{total} \quad (6)$$

In equation (6), $n_c$ is the number of computations required, $T_{total}$ is the total time for the computations, M is the number of velocity bins, and $N_A$ is the number of acceleration bins. According to conventional technology, this rate of processing described in equation (6) is probably not feasible, and certainly not practical for many applications. Even if computation at this rate was feasible, it would be prohibitively expensive.

The present invention provides a more efficient means of performing noncoherent integration on low SNR signals with acceleration uncertainty. For instance, if $N_A$ is taken to be a power of 2, the number of computations can be reduced to:

$$n_c = MN_A \log_2(N_A) \quad (7)$$

In equation (7), $n_c$ is the number of computations required, M is the number of velocity bins, and $N_A$ is the number of acceleration bins.

The reduced computational requirement achieved through use of the present invention results in a computation rate of:

$$n_c/T_{total} = MN_A \log_2(N_A)T_{total} \quad (8)$$

In equation (8), $n_c$ is the number of computations required, $T_{total}$ is the total time for the computations, M is the number of velocity bins, and $N_A$ is the number of acceleration bins. Thus, the present invention reduces the processing requirements by a factor of at least $N_A/\log_2(N_A)$. For example, in the case where $N_A=1024$, the processing load will be reduced by approximately two orders of magnitude.

By way of illustration, an 11.2 micron laser may typically have a velocity uncertainty of 3,000 meters/second, an acceleration uncertainty of 140 meters/second$^2$, a 100 microsecond coherent integration time, and a 100 millisecond total integration time. For these values, $\delta v=0.056$ m/s, $\delta a=0.56$ m/s$^2$, M=53,570, and $N_A$=256, resulting in $n_c=5.5 \times 10^8$. Using conventional brute-force processing would require a real-time processing capability of:

$$n_c/T_{total}=3.51 \times 10^{10}=35.1 \text{ gig-operations/second (GOPS)}.$$

However, the exemplary embodiments of the present invention reduce the real-time processing requirement to:

$$n_c/T_{total}=1.1 \times 10^9 =1.1 \text{ GOPS}.$$

This example assumes the processing load is performed only for the acceleration integration, and does not include the FFTs or other operations. In addition, $N_A$ has been rounded up in the example from 250 to 256, which is the next power of 2. This was done to take advantage of a more efficient branching algorithm for the noncoherent integration. The processing capability required of the present invention, namely 1.1 GOPS, is significant at the present state of processing technology. But the processing capability required of the present invention is substantially less that the 35.1 GOPS processing capability that would be required for the brute-force approach of a conventional radar signal processor.

Figure 3:
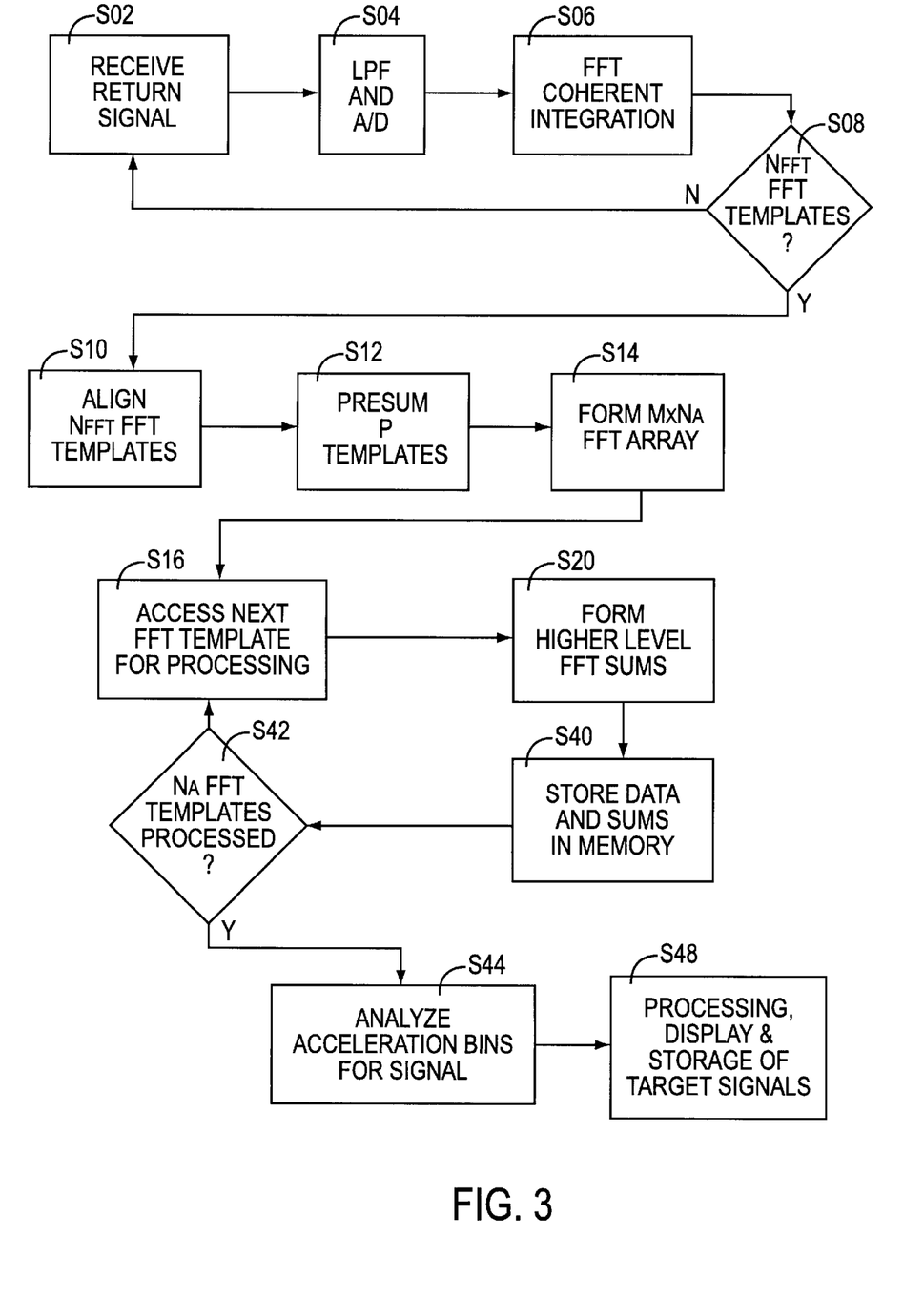
FIG. 3 is a flow chart illustrating noncoherent integration radar signal processing, according to the present invention.

FIG. 3 is a flow chart illustrating noncoherent integration radar signal processing, according to the present invention. A return signal reflected from a target object is received at step S02 by a radar receiver. The specifics of the radar receiver depend upon the nature of the signal being transmitted and received. Typically, a radar receiver consists of one or more detectors, antennas, or other apertures, in conjunction with a feed network and low noise amplifiers. In step S04, the received return signal is processed through an anti-aliasing low pass filter, and then A/D converted from an analog waveform to a digital time-series signal. The A/D conversion is typically performed using an analog-to-digital converter unit (ADC) or other A/D circuitry within the radar system.

At step S06, the return signal is fast Fourier tranform (FFT) processed to convert digital time-series return signals into a frequency domain representation. In the present context, a frequency domain representation is called an FFT template, and consists of M FFT lines. According to an exemplary embodiment of the present invention, each of the M FFT lines corresponds to a particular doppler frequency range. Thus, each of the M FFT lines corresponds to a velocity bin. In alternative embodiments of the present invention, a velocity bin can consist of more than one FFT line. The number of FFT lines per velocity bin—that is, the frequency range per velocity bin—depends, for instance, on the velocity resolution requirements and the processing resources available. The FFT transformation of step S06 is often known as coherent integration since, in general, radar signals are coherently transmitted. Coherently integrating a particular time segment of return signal results in M number of FFT lines, with most of the target energy concentrated in a single or a few FFT lines. In practice, it is preferable to use coherent integration to the maximum extent allowed by the coherency time of the signal to be detected. According to a preferred embodiment of the present invention, the FFT processing of step S06 uses a Hamming-window FFT. Alternatively, a Hanning window, Blackman window, rectangular window, or the like could be used for the coherent integration of step S06.

The signal processing steps of the present method are preferably continuously executed, with each step being performed on a return signal while other processing steps are performed on later and/or earlier return signals. For instance, at the same time one return signal is being received in step S02, a previously received return signal is undergoing front-end processing in step S04 while a return signal received earlier yet undergoes coherent integration in step S06, and so on. To achieve this, the radar signal processor preferably has one or more memories for storing signals in various stages of being processed.

Step S08 counts the number of FFT templates to assign a template number to each of $N_{FFT}$ FFT templates as they are generated. This allows the number of FFT templates which have been generated to be counted. As templates are generated, step S10 may then be performed to align the FFT templates so that corresponding FFT lines, or units of data, in each of the templates have the same frequency. Alignment involves matching the frequencies of successive FFT templates. Since frequency corresponds to target velocity, frequency alignment enables the formation of velocity bins from the FFT templates. In step S12, P templates are presummed. In general, P×$N_A$ templates can be noncoherently presummed by summing P successive templates at a time to form the $N_A$ templates referenced in successive steps. Since phase decorrelates for lengths of time longer than the coherency time, it is discarded prior to presumming. Phase is discarded by taking the magnitude or magnitude squared of each line in order to noncoherently add the FFT templates.

Once frequency alignment has been achieved and P templates presummed, the method proceeds to step S14 where the $N_A$ FFT templates are stored, conceptually forming an M×$N_A$ FFT array. For ease of illustration, the array preferably has M FFT lines along an x-axis, and $N_A$ FFT templates along a y-axis. The FFT templates, preferably arranged from top to bottom in the order of return signal arrival time, form the rows of the FFT array. Each column of the FFT array contains FFT lines having the same frequency. Thus, the FFT array columns form velocity bins, also known as velocity gates.

The method then proceeds to step S16 to access FFT templates for summation processing. According to one embodiment, the FFT templates are accessed one at a time for summation processing. Alternatively, the FFT templates can be accessed two or more at a time for processing. In step S16, FFT line data of each template is accessed and inputted or stored into memory for the data manipulation and summation processing in forming FFT line sums. For instance, the FFT line data of a first template, say FFT template 0, is accessed and read into a memory in step S16. Each time step S16 is performed another FFT template is accessed (or two more, or three more, etc., depending the number of templates being accessed at once per that embodiment). The method then proceeds from step S16 to step S20, the step in which the summation of FFT lines takes place.

A level 1 FFT line sum—that is, the noncoherent integration of two FFT lines—involves adding the FFT lines from two consecutive FFT templates. According to the binary branching technique of the present invention, a level 2 sum involves adding two level 1 sums, a level 3 sum involves adding two level 2 sums, and so on. Lower level sums which are added together to form higher level sums are known as intermediate sums. In step S20 all FFT sums which may be made upon processing a particular FFT template are preferably performed as that FFT template is processed. Thus, a single iteration of step S20 may involve a level 1 sum of two FFT lines, and may also involve higher level sums such as a level 2 sum of two level 1 sums. For example, upon accessing template 3 in step S20, a level 1 sum (FFT 2 summed with FFT 3) is performed and a level 2 sum is also performed, the level 2 sum consisting of two level 1 sums (FFT 0/FFT 1 summed with FFT 2/FFT 3). In other words, performing step 20 involves accessing and processing an FFT template, and may also involve summing together lower level intermediate sums to produce higher level sums, if any are possible from the data.

The scheme of sums to be performed, the presum number P, and the number of levels, are each based upon the range of acceleration values which can be detected $a_{max}$, the acceleration resolution δa, the time to collect an FFT template T, and the total integration time $T_{total}$. A relatively large acceleration uncertainty entails a wider range of potential acceleration values to be analyzed, that is, more acceleration slopes. Thus, the scheme of sums to be performed may be altered in order to achieve more or fewer acceleration bins. The acceleration detection range $a_{max}$, can be expressed as:

$$a_{max}=(\lambda/2PT^2)=N_A(\delta a) \quad (9)$$

In equation (9), λ is the wavelength of the radar frequency, P is the number of presums, T is the time to collect an FFT template, $N_A$ is the number of (presummed) FFT templates, and ba is the acceleration resolution.

In step S40, the FFT template data and intermediate sums can be stored into memory of the radar signal processor for use in forming higher level FFT sums. In practice, the results of the other steps of the present invention may be stored in memory as well. For the sake of illustrative clarity, only memory storage step S40 is shown, rather than depicting storage to memory and retrieval from memory between various steps of the method. Thus, step S40 is intended to represent the storage of various intermediate and final processing steps of the present invention.

Step S42 determines whether all $N_A$ FFT templates of the array have been processed. If fewer than $N_A$ templates have been processed, the method returns to step S16 to process another FFT template. Once $N_A$ templates have been processed, all FFT line sums will have been noncoherently integrated to form the various acceleration bins, according to the present invention. When the processing of all $N_A$ templates has been completed, the data will have been transformed from an array of M velocities by $N_A$ templates to an array of M velocities by $N_A$ acceleration bias. Accordingly, the acceleration bins can be analyzed for signal detection purposes.

In step S44, the two dimensional (M velocities by $N_A$ acceleration bins) array is analyzed to determine whether or not a signal is present. If a peak in the data passes the detection threshold, a detection is declared. The location of the peak indicates the velocity and acceleration of the target. The process then proceeds to step S48 for processing, display and storage of the detected target signals.

Figure 4:
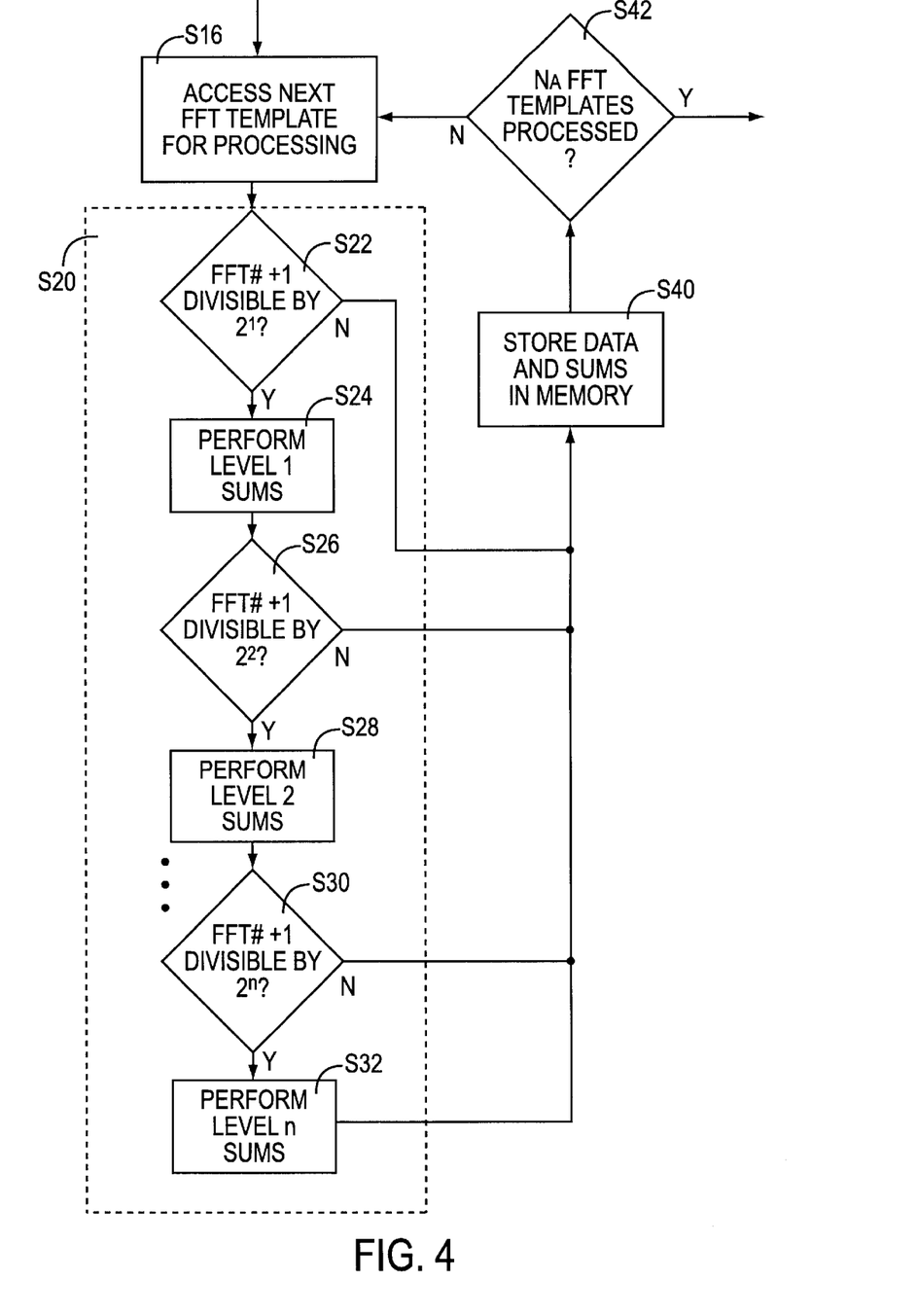
FIG. 4 is a detailed flow chart depicting an exemplary binary branching process for formation of FFT sums, according to the present invention.

FIG. 4 is a detailed flow chart depicting an exemplary binary branching process for formation of FFT sums, according to the present invention. Computational savings of the binary branching process are realized because a given FFT line from a particular template is summed only twice into intermediate sums as part of the level 1 processing, instead of being summed $N_A$ times, where $N_A$ is the number of FFT templates (and also the number of acceleration bins). These intermediate sums at lower levels are then used for forming sums at higher levels in an efficient manner.

The steps S22 through S32 of FIG. 4 illustrate a more detailed recitation of a step S20 from FIG. 3. The method of FIG. 4 proceeds from step S16 in which FFT templates are accessed for summation processing. The step S16 involves accessing an FFT line of data and inputting or storing it into memory so that the data may be manipulated and summation processed to form FFT line sums.

Upon accessing an FFT template in step S16, the method proceeds to step S22 where the binary branching routine begins. In the following discussions (presummed) FFT templates are numbered from 0 to $N_A-1$. Various steps of the binary branching routine depend upon the order of FFT templates as reflected by the FFT template numbers depicted on the vertical axis of FIG. 2A and FIG. 2B. In step S22 it is determined whether the quantity (FFT#+1)—that is, the FFT number being processed plus one—is a multiple of $2^1$. An FFT template number plus one determined not to be a multiple of $2^1$ (e.g., FFT#0+1=1; FFT#6+1=7; and so on) is routed to step S40 for storage of the FFT template data. A determination in step S16 that an FFT template plus one is a multiple of $2^1$ results in the level 1 sums for that FFT being performed in step S24 and the method continuing to step S26. The step S26 either determines that the FFT template number plus one is not a multiple of $2^2$ (e.g., FFT#2+1=3) and routes the method to step S40, or determines that the FFT template number plus one is a multiple of $2^2$ (e.g., FFT#3+1=4 or FFT#11+1=12) and advances the method to step S28 to perform the level 2 sums involving that FFT.

The process proceeds similarly until step 30 determines that the FFT template number plus one is a multiple of $2^n$. When the FFT template number plus one equals a multiple of $2^n$, step 30 either routes the method back to step S40 or on to step S32 to perform the level n sums. For optimal efficiency, the FFT array is structured such that the number of templates N is equal to $2^n$, according to a preferred embodiment of the present invention. However, an array can be constructed with any arbitrary number of templates if the parameters of the radar system or other requirements dictate such an array, according to alternative embodiments of the present invention. This situation can arise, for example, when $2^{n-1}$ or more templates are collected, but there is not enough time to collect $2^n$ templates. In such a situation, an arbitrary number of templates can be accommodated by including an additional number of templates composed of all zeros to make up a total of $2^n$ templates. There are still computational efficiencies to be realized for an array of arbitrary size, since $2^n \times 2$ is smaller than $M^2$ for $2^{n-1} \leq M \leq 2^n$.

Figure 5A:
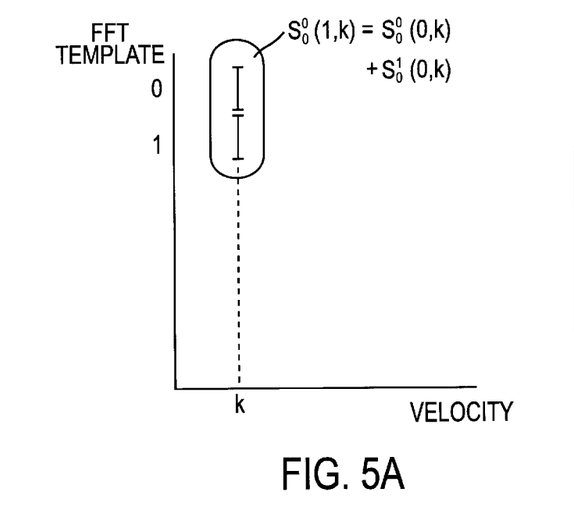
FIGS. 5A–C depict exemplary FFT line sums made as part of level 1 summation processing, according to the present invention.
Figure 5B:
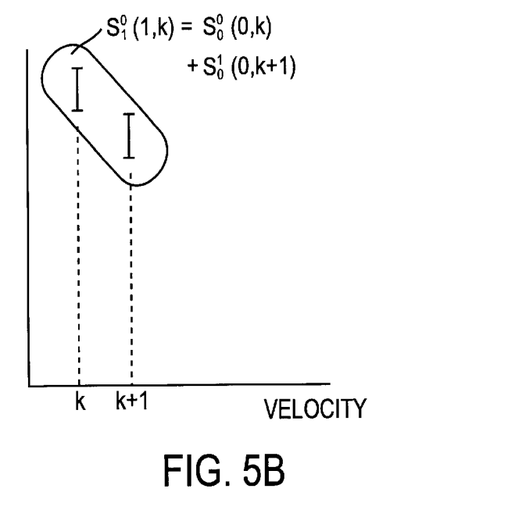
Figure 5C:
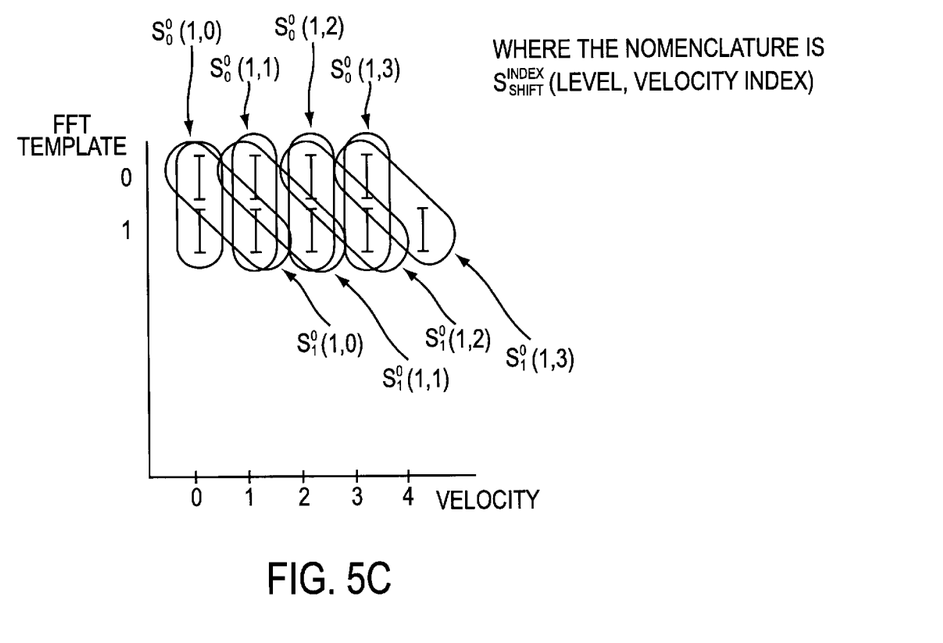

FIGS. 5A–C depict exemplary FFT line sums made as part of level 1 summation processing, labeled according to the nomenclature $N_A^2$ [level, $v_{index}$]. Level 1 sums are performed on the FFT lines of each subsequent pair of FFT templates, as the signal processor works its way through data contained in an FFT array. For instance, after accessing template 0 and then accessing template 1, level 1 processing is performed on the applicable FFT lines of both templates 0 and 1. Level 1 processing is performed upon each subsequent pair of FFT templates as well. That is, level 1 sums are formed for templates 0 and 1, then for templates 2 and 3, then for templates 4 and 5, and so on.

Two level 1 sums—a zero-shift sum and a one-shift sum—are performed for the FFT line in velocity bin 0 of template 0. FIG. 5A shows the zero-shift level 1 sum, and FIG. 5B shows the one-shift level 1 sum. The zero-shift level 1 sum involves summing two FFT lines within the same velocity bin. According to the present invention, a system of FFT array nomenclature is used to label the FFT lines within an FFT array, and also to define the various sums which take place in processing the FFT array. The exemplary system of FFT array nomenclature described herein was designed for convenience and mathematical efficiency in describing and labeling the FFT array. Those skilled in the art will appreciate that alternative FFT array nomenclature or labeling schemes can be used in describing the FFT templates, without departing from the present invention.

According to a preferred embodiment of FFT array nomenclature, a particular FFT line can be labeled as:

$$S_0^{template}[0, v_{index}] = FFT^{template}(v_{index}) \quad (10)$$

In array nomenclature equation (10), the template superscript variable refers to the FFT template (array row). The first FFT nomenclature variable, namely the "0" of "[0, $v_{index}$]", represents the summation level. By convention, the level that sums two single FFT lines is defined to be level 1. Summation level 0 represents a single FFT line. The variable "$v_{index}$" of "[0, $v_{index}$]" represents the velocity bin (array column) along the FFT array x-axis of the FFT line.

In general, the "S" in the present system of FFT array nomenclature refers to a summation. However, when the subscript of S is set to zero and the first FFT nomenclature variable (that is, the "0" inside the brackets) is set to 0, the equation (10) represents a single FFT line defined by template and $v_{index}$, rather than a summation.

The two FFT lines of FIG. 5A can be labeled using the FFT array nomenclature. For instance, the top FFT line of FIG. 5A in velocity bin k of template 0 can be labeled as $S_0^0[0,k]$. The bottom FFT line of FIG. 5A can be labeled as $S_0^1[0,k]$.

Level 1 processing involves two sums—a no-shift sum and a one-shift sum—being made for any particular FFT line in each pair of FFT templates. FIG. 5A shows the no-shift sum. FIG. 5B shows the one shift sum. The no-shift sum involves the sum of the two FFT lines both within the same velocity bin.

According to the preferred embodiment of nomenclature, a particular FFT sum can be labeled as:

$$S_{shift}^{index}[\text{level}, v_{index}] = S_{floor(shift/2)}^{2 \cdot index}[\text{level}-1, v_{index}] + S_{floor(shift/2)}^{2 \cdot index+1}[\text{level}-1, v_{index}+\text{ceiling(shift/2)}] \quad (11)$$

In the $S_{shift}^{index}$ [level, $v_{index}$] term of nomenclature equation (11), the S on the left side of the equation refers to a sum of the other two intermediate summations on the right side of the equation. The superscript variable index refers to the base FFT template of the sum for level 0 nomenclature. For a given summation level, the index variable increments through values of 0, 1, . . . $2^{maxlevel-level}-1$. Thus, the highest value of index, namely $2^{maxlevel-level}-1$, depends upon the summation level being performed, such as, level 1, level 2, or so on. Lower level sums are performed more often within a sequence of FFT templates than are higher level sums. For instance, the level 1 sums are performed on every subsequent pair of FFT templates. That is, level 1 sums are performed for templates 0 and 1, then on templates 2 and 3, then on templates 4 and 5, and so on. Level 2 sums, on the other hand, are performed on every four templates. That is, level 2 sums are performed on the intermediate sums from templates 0–3, then on the intermediate sums from templates 4–7, and so on. However, the number of shifts (one sum per shift) computed for each sequence of templates doubles every time the level is increased, so that the total number of sums per level is constant. Regarding maxlevel, the highest level sums are performed once for intermediate sums from all of the templates. In performing the maxlevel summation, $N=2^{maxlevel}$ shifts are computed.

The subscript variable shift of $S_{shift}^{index}$ refers to the number of velocity bin shifts for a sum. For a given summation level, the subscript variable shift increments through values of 0, 1, . . . $2^{level}-1$. For example, in performing level 1 sums, the variable shift increments only from 0 to 1. These two level 1 sums are reflected in FIGS. 5A and 5B. When the variable shift equals 0, a zero-shift sum is performed, as shown in FIG. 5A. When the variable shift equals 1 (namely, when $2^{level}-1=2^1-1=1$), a one-shift sum is performed, as shown in FIG. 5B. Level 1 sums have only one shift at most, but are performed on each subsequent pair of FFT templates. By contrast, a level maxlevel sum has $2_{maxlevel}$ shifts, and is performed only once per FFT array (i.e., index=$2^{maxlevel-level}-1=2^0-1=0$).

The first FFT nomenclature variable, level, of equation (11) refers to the level of summation taking place (e.g., level 1, level 2). The variable level takes on values of 0, 1, . . .

maxlevel. The variable maxlevel, in turn, is defined such that $2^{maxlevel}$ equals the total number of templates in an array, according to a preferred embodiment. The sum shown in FIG. 5A is a level 1 sum, and so the variable level equals 1 for FIG. 5A. The variable $v_{index}$ represents the velocity bin along the x-axis of the base FFT line for the sum. The base FFT line is the FFT line of the lowest FFT template in the sum. For instance, the top FFT line of FIG. 5A is the base FFT line of that sum. The variable $v_{index}$ can take on values of zero to the highest velocity bin in the FFT array. Since the sum of FIG. 5A is within velocity bin k, the variable $v_{index}$ for FIG. 5A is k.

The variable quantity "$v_{index}$+ceiling(shift/2)" of the last term of equation (11) refers to the base FFT line of the second lower level sum being added. The subscript floor (shift/2) itself increments through values $0 \ldots 2^{level}-1$. The addition of the term ceiling(shift/2) to $v_{index}$ of the second added intermediate sum means that the base FFT line of that sum is moved from the first intermediate sum to a higher velocity bin by a number of velocity bins equal to ceiling (shift/2).

Following the processing of FFT templates 0 and 1, FFT templates 2 and 3 are accessed and processed as part of the level 1 summation processing. As FFT templates 2 and 3 are processed, the signal processor performs the level 1–4 sums for the template pair and also performs the level 2 sums for templates 1–4 as well. As more templates are processed, the level 1 sums are themselves summed into level 2 sums, and the level 2 sums are summed into level 3 sums, and so on as processing of the higher levels takes place. For instance, level 2 sums include two sets of level 1 sums added together.

Table 1 depicts the numbers of various operations occurring as part of an exemplary embodiment of binary branching FFT summation processing, according to the present invention. Table 1 is based on an FFT array size of N=64 FFT templates by M=1024 velocity bins. The computational savings in the binary branching algorithm come from the fact that any particular FFT line from a given template is summed only twice into intermediate sums instead of being summed $N_A$ times. These intermediate sums at lower levels are then used for forming sums at higher levels in an efficient manner for a total of $M \times N \times \log_2 N$ adds.

TABLE 1

| Level | No. of FFT templates per sum | No. of sums per level | No. of shifts per sum | No. of adds per level |
|---|---|---|---|---|
| 1 | 2 | 32 | 0 or 1 (2) | NxM |
| 2 | 4 | 16 | 0 thru 3 (4) | NxM |
| 3 | 8 | 8 | 0 thru 7 (8) | NxM |
| 4 | 16 | 4 | 0 thru 15 (16) | NxM |
| 5 | 32 | 2 | 0 thru 31 (32) | NxM |
| 6 | 64 | 1 | 0 thru 63 (64) | NxM |

Figure 6A:
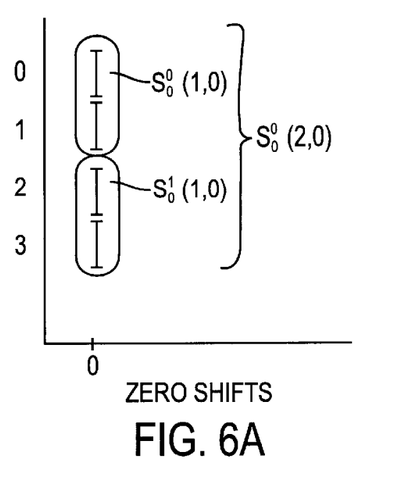
FIGS. 6A–D depict exemplary FFT line sums made as part of level 2 summation processing, according to the present invention.

FIGS. 6A–D depict exemplary FFT line sums made as part of level 2 summation processing. The level 2 summation processing involves the sums with zero shifts, one shift, two shifts, and three shifts, as shown in FIG. 6A, 6B, 6C and 6D, respectively. The radar signal processor performs various levels of summation processing (e.g., level 1, level 2, and so on) as the FFT array data is processed. The intermediate sums from level 1 summation processing are themselves summed to form the level 2 sums. In other words, each level 2 sum consists of two previously performed level 1 sums. For example, to get the zero-shift level 2 sum, the level 1 zero-shift sum from velocity bin 0 of templates 0 and 1 is added to the level 1 zero-shift sum from velocity bin 0 of templates 2 and 3, as indicated in FIG. 6A.

Figure 6B:
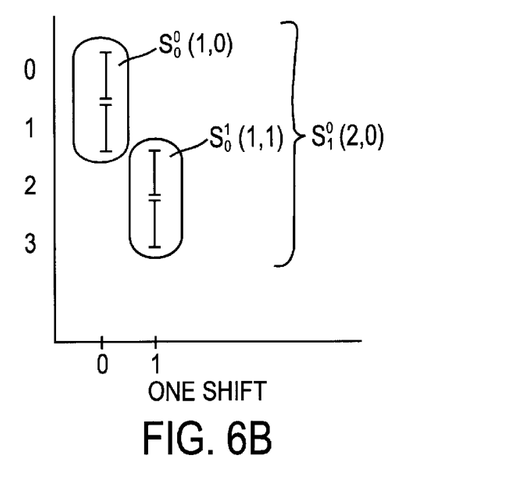

A preferred embodiment of the level 2 one-shift sum is shown in FIG. 6B. This one-shift sum involves the level 1 zero-shift sum from velocity bin 0 of templates 0 and 1 being added to the level 1 zero-shift sum from velocity bin 1 of templates 2 and 3. Alternatively, a zero-shift sum can be added to a one-shift sum, or a one-shift sum to a zero-shift sum to achieve the level 2 one-shift sum. For example, an alternative embodiment of the level 2 one-shift sum can consist of the level 1 zero-shift sum from velocity bin 0 of templates 0 and 1 being added to the level 1 one-shift sum from velocity bins 0/1 of templates 2 and 3.

Figure 6C:
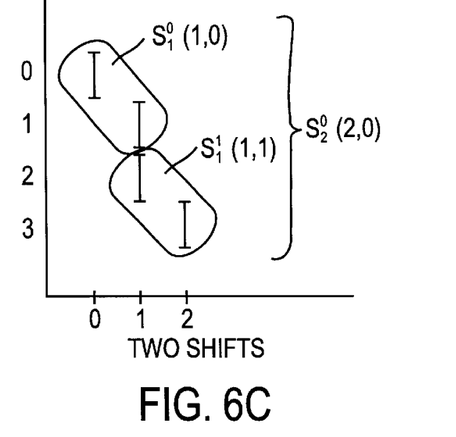

A preferred embodiment of the level 2 two-shift sum consists of a one-shift sum from velocity bins 0/1 of templates 0 and 1 being added to a one-shift sum from velocity bins 1/2 of templates 2 and 3. Alternatively, the two shift sum could consist of a zero-shift sum from velocity bin 0 of templates 0 and 1 added to a one-shift sum from velocity bins 2/3 of templates 2 and 3. Other alternatives are possible.

Figure 6D:
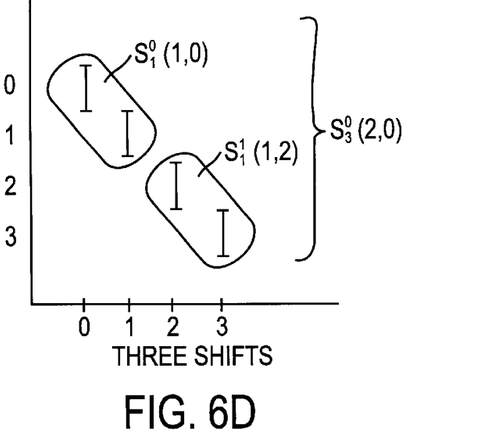

FIG. 6D depicts the three shift level 2 sum as consisting of a one-shift sum from velocity bins 0/1 of templates 0 and 1 being added to another one-shift sum from velocity bins 2/3 of templates 2 and 3.

The total number of shifts within a sum can be expressed as:

$$\text{shifts} = \text{floor(shift/2)} + \text{floor(shift/2)} + [\text{ceiling(shift/2)} - \text{floor(shift/2)}] \quad (12)$$

The first "floor(shift/2)" in equation (12) depicts the number of shifts in the top intermediate sum of FIG. 6D, that is, $S_1^0$ (1,0), while the second "floor(shift/2)" depicts the number of shifts in the bottom intermediate sum of FIG. 6D, that is, $S_1^1$ (1,2). The term "ceiling(shift/2)" represents the number of shifts that the bottom intermediate sum is shifted over from the lowest frequency bin of the top intermediate sum. Thus, the term "[ceiling(shift/2)−floor(shift/2)]" equals zero when the two intermediate sums overlap (e.g., FIG. 6C), and equals one when the two intermediate sums do not overlap (e.g., FIG. 6D).

Assuming positive acceleration was illustrated by increasing velocity index of the target as the templates increased, the invention as described accommodates only positive accelerations. However, the invention is easily adapted to handle negative accelerations or a range of accelerations that includes both positive and negative accelerations. This is accomplished by offsetting the acceleration characteristics of the signal by imposing an increasingly positive velocity shift as time (template number) progresses.

One method of accomplishing this shift is to shift, or circularly rotate, the FFT velocity indices appropriately as part of the matrix formation of step S14. This can be written as a modification of equation (10):

$$S_0^{template}[0, v_{index}] = FFT^{template}[v_{index} - \text{round}[(a_{offset})(\text{template})(T/\delta v)]] \quad (13)$$

This results in an acceleration range of: $a_{offset} \leq a \leq a_{max} + a_{offset}$, where $a_{offset}$ may be positive or negative.

Figure 7:
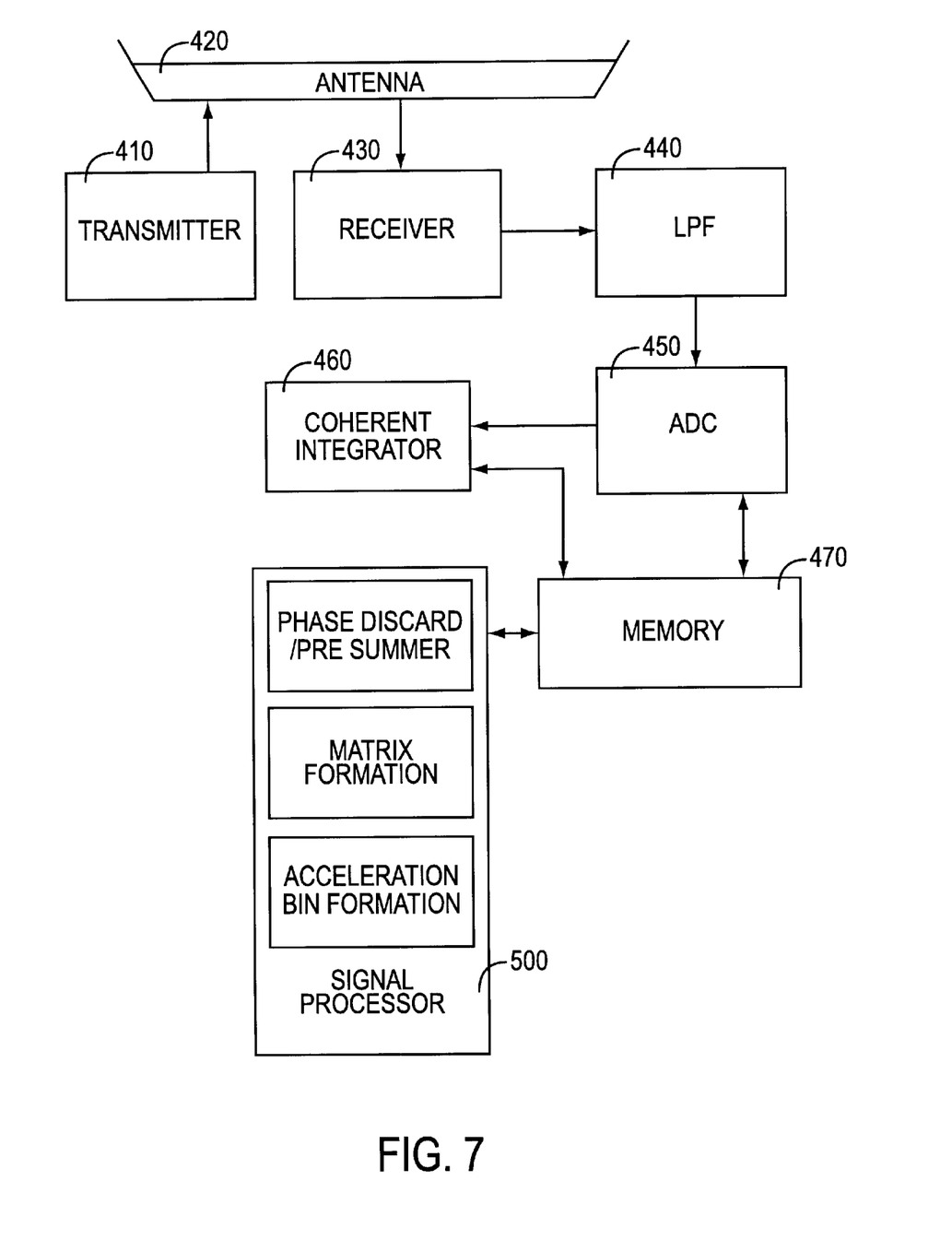
FIG. 7 depicts a radar system which can process signals using the binary branching technique, according to the present invention.

FIG. 7 depicts a radar system which can process signals using the binary branching technique according to the present invention. Signals are transmitted from transmitter 410, which can either use a dedicated transmitter antenna or an antenna 420 shared with a receiver 430 of the radar. Return signals reflected from a target object are received at the receiver 430 via the antenna 420. The received signals are low pass filtered and A/D converted by a LPF 440 and an ADC 450, respectively. Upon being A/D converted, the digital signals are then transformed into the frequency domain in coherent integrator 460, to form FFT templates of the return signals. The coherent integrator 460 may be a fast Fourier transform filter.

During various stages of signal processing, signal manipulation and computation, signals can be saved, stored and retrieved in memory 470. Signal processor 500 discards the signal phase, performs presums, and forms an FFT matrix of the FFT templates. Upon forming acceleration bins, the signal processor 500 analyzes the various acceleration bins to detect the presence of a target object return signal.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method of radar signal processing to detect a target object, the method comprising the steps of:
   transmitting radar signals from a radar system, the radar signals being transmitted according to a predetermined frequency scheme;
   receiving signals at the radar system within a frequency band, the frequency band including frequencies of the predetermined frequency scheme and also including frequencies of return signals comprising portions of the radar signal echoed from the target object;
   coherently integrating the received signals to transform time domain data of the received signals into frequency domain templates of data;
   arranging the frequency domain templates into an array matrix;
   processing at least a portion of the frequency domain templates to form presums;
   storing the presums required for use in forming higher level presums or acceleration bins;
   forming acceleration bins from the presums; and
   analyzing the acceleration bins to detect the presence of a return signal from the target object.

2. The method of processing radar signals to detect a target object according to claim 1, wherein each of the units of data forming one of the sums in the processing step is from a different one of the templates.

3. The method of processing radar signals to detect a target object according to claim 1 wherein the step of performing coherent integration comprises a fast Fourier transform (FFT) operation, Fourier transform, filter banks, or optical processing.

4. The method of processing radar signals to detect a target object according to claim 1, further comprising the step of:
   forming velocity bins within the array, each of the velocity bins comprising a portion having a same frequency of each of the templates.

5. The method of processing radar signals to detect a target object according to claim 1, further comprising a step of:
   discarding phase data of the received signals.

6. The method of processing radar signals to detect a target object according to claim 1, wherein the step of processing at least a portion of the frequency domain templates comprises noncoherently integrating units of data from a plurality of the frequency domain templates.

7. The method of claim 1, wherein the frequencies of the return signals are Doppler shifted from the predetermined frequency scheme by unknown amounts.

8. A method of signal processing electromagnetic signals to passively detect a target object, the method comprising the steps of:
   receiving in a detection system the electromagnetic signals including target object signals, wherein amounts of frequency shifting of the target object signals are unknown;
   coherently integrating the received electromagnetic signals to transform time domain data of the received electromagnetic signals into frequency domain templates of data, wherein each of the frequency domain templates corresponds to a time domain segment of the received electromagnetic signal;
   arranging the frequency domain templates into an array matrix;
   processing at least a portion of the frequency domain templates to form presums;
   storing the presums required for use in forming higher level presums or acceleration bins;
   forming acceleration bins from the presums; and
   analyzing the acceleration bins to detect the presence of the target object signals.

9. The method of signal processing to detect a target object according to claim 8, wherein each of the units of data forming one of the sums in the processing step is from a different one of the templates.

10. The method of signal processing to detect a target object according to claim 8, wherein the step of performing coherent integration comprises a fast Fourier transform (FFT) operation.

11. The method of signal processing to detect a target object according to claim 8, further comprising the step of:
    forming velocity bins within the array, each of the velocity bins comprising a portion having a same frequency of each of the templates.

12. The method of processing radar signals to detect a target object according to claim 8, further comprising a step of:
    discarding phase data of the received electromagnetic signals.

13. The method of signal processing to detect a target object according to claim 8, wherein the step of processing at least a portion of the frequency domain templates comprises noncoherently integrating FFT lines of the frequency domain templates.

14. An apparatus for processing radar signals to detect a target object, the apparatus comprising:
    transmitter for transmitting radar signals according to a predetermined frequency scheme;
    receiver for receiving signals at the radar system within a frequency band including frequencies of the predetermined frequency scheme and also including frequencies of return signals comprising portions of the radar signal echoed from the target object;
    integrator for performing coherent integration on the received signals to transform. time domain data of the received signals into frequency domain templates of data;
    radar signal processor for arranging the frequency domain templates into an array matrix, and for processing at least a portion of the templates to form sums; and
    memory storing the sums for use in forming acceleration bins, each of the acceleration bins formed from the data of different ones of the templates and having different frequencies;

wherein the signal processor analyzes the acceleration bins to detect the presence of a return signal from the target object.

15. The apparatus of claim 14, wherein the frequencies of the return signals are frequency shifted from the predetermined frequency scheme.

16. A method of radar signal processing to detect a target object, the method comprising the steps of:

receiving radar return signals;

coherently integrating the return signals into frequency domain templates comprising units of data, each of the return signals, being associated with one of the frequency domain templates;

forming an array matrix from the frequency domain templates;

noncoherently integrating the units of data from a plurality of the frequency domain templates into presums;

forming arrangements of the presums; and analyzing the arrangements of the presums to detect the target object.

17. The method of processing radar signals to detect a target object according to claim 16, wherein the arrangements of the presums comprise velocity bins.

18. The method of processing radar signals to detect a target object according to claim 16, wherein the arrangements of the presums comprise acceleration bins.

19. The method of processing radar signals to detect a target object according to claim 18, wherein $N_A$ of the acceleration bins are formed, $N_A$ being characterized according to the relationship:

$$N_A = \Delta a / \delta a$$

where $\Delta a$ is the acceleration uncertainty, and $\delta a$ is the acceleration resolution.

* * * * *